US009397494B2

(12) United States Patent
Hofheinz et al.

(10) Patent No.: US 9,397,494 B2
(45) Date of Patent: Jul. 19, 2016

(54) ELECTRICAL MONITORING DEVICE AND METHOD FOR SAFEGUARDING THE PROTECTIVE FUNCTION OF A TYPE A RESIDUAL CURRENT DEVICE (RCD)

(75) Inventors: Wolfgang Hofheinz, Gruenberg (DE); Harald Sellner, Gruenberg (DE)

(73) Assignee: BENDER GMBH & CO. KG, Gruenberg (DE)

( * ) Notice: Subject to any disclaimer, the term of this patent is extended or adjusted under 35 U.S.C. 154(b) by 483 days.

(21) Appl. No.: 13/462,623

(22) Filed: May 2, 2012

(65) Prior Publication Data

US 2013/0070374 A1 Mar. 21, 2013

(30) Foreign Application Priority Data

Sep. 19, 2011 (DE) .......................... 10 2011 082 941

(51) Int. Cl.
*H02H 3/16* (2006.01)
*H02H 3/33* (2006.01)
*H02H 5/12* (2006.01)

(52) U.S. Cl.
CPC . *H02H 3/332* (2013.01); *H02H 5/12* (2013.01)

(58) Field of Classification Search
CPC combination set(s) only.
See application file for complete search history.

(56) References Cited

U.S. PATENT DOCUMENTS

| 5,670,861 | A * | 9/1997 | Nor | B60L 3/0046 |
| | | | | 307/10.7 |
| 6,392,422 | B1 * | 5/2002 | Kammer | H02H 1/06 |
| | | | | 324/509 |
| 8,873,207 | B2 * | 10/2014 | Dillig | H01H 83/02 |
| | | | | 324/510 |
| 2005/0212505 | A1 * | 9/2005 | Murray | G01R 15/146 |
| | | | | 324/126 |
| 2007/0063711 | A1 * | 3/2007 | Smithson | G01R 27/18 |
| | | | | 324/620 |
| 2010/0283577 | A1 * | 11/2010 | Koch | G01D 4/002 |
| | | | | 340/5.2 |
| 2011/0273139 | A1 * | 11/2011 | Hofheinz | 320/109 |
| 2012/0246070 | A1 * | 9/2012 | Vadhri | G06Q 20/367 |
| | | | | 705/42 |
| 2012/0249070 | A1 * | 10/2012 | Sellner | B60L 3/0069 |
| | | | | 320/109 |
| 2014/0312877 | A1 * | 10/2014 | Kammer | G01R 19/10 |
| | | | | 324/76.11 |

FOREIGN PATENT DOCUMENTS

| DE | 4110335 C2 | 7/1995 |
| DE | 19826410 A1 | 1/1999 |
| DE | 19735412 A1 | 2/1999 |
| DE | 19911698 A1 | 9/2000 |
| DE | 19943801 A1 | 3/2001 |

(Continued)

OTHER PUBLICATIONS

European Patent Office, Search Report, EP 12171856, Jul. 24, 2013, 6 pages.

(Continued)

*Primary Examiner* — Thienvu Tran
*Assistant Examiner* — Angela Brooks
(74) *Attorney, Agent, or Firm* — Quarles & Brady LLP

(57) ABSTRACT

A monitoring device and a method safeguards the function of a type A residual current device (RCD) in a power supply system. The monitoring device includes a measuring current transformer circuit for detecting a DC fault current ($I_F$), an evaluation unit for processing the current detected by the measuring current transformer circuit, and a communication interface connected to the output of evaluation unit. In one embodiment, the monitoring device forms part of an electrical protection device with a type A residual current device (RCD) for ensuring the function of the type A residual current device (RCD).

17 Claims, 1 Drawing Sheet

(56) References Cited

FOREIGN PATENT DOCUMENTS

| | | | | |
|---|---|---|---|---|
| DE | WO0120742 | * | 3/2001 | ............... H02H 3/33 |
| DE | 102004020997 A1 | | 11/2005 | |
| EP | 1287599 A2 | | 3/2003 | |
| WO | WO0120742 A1 | * | 3/2001 | |

OTHER PUBLICATIONS

State Intellectual Property Office of People's Republic of China, First Office Action and Search Report, Application No. 201210157968.6, Jul. 2, 2014, 8 pages [English Language Translation Only].

* cited by examiner

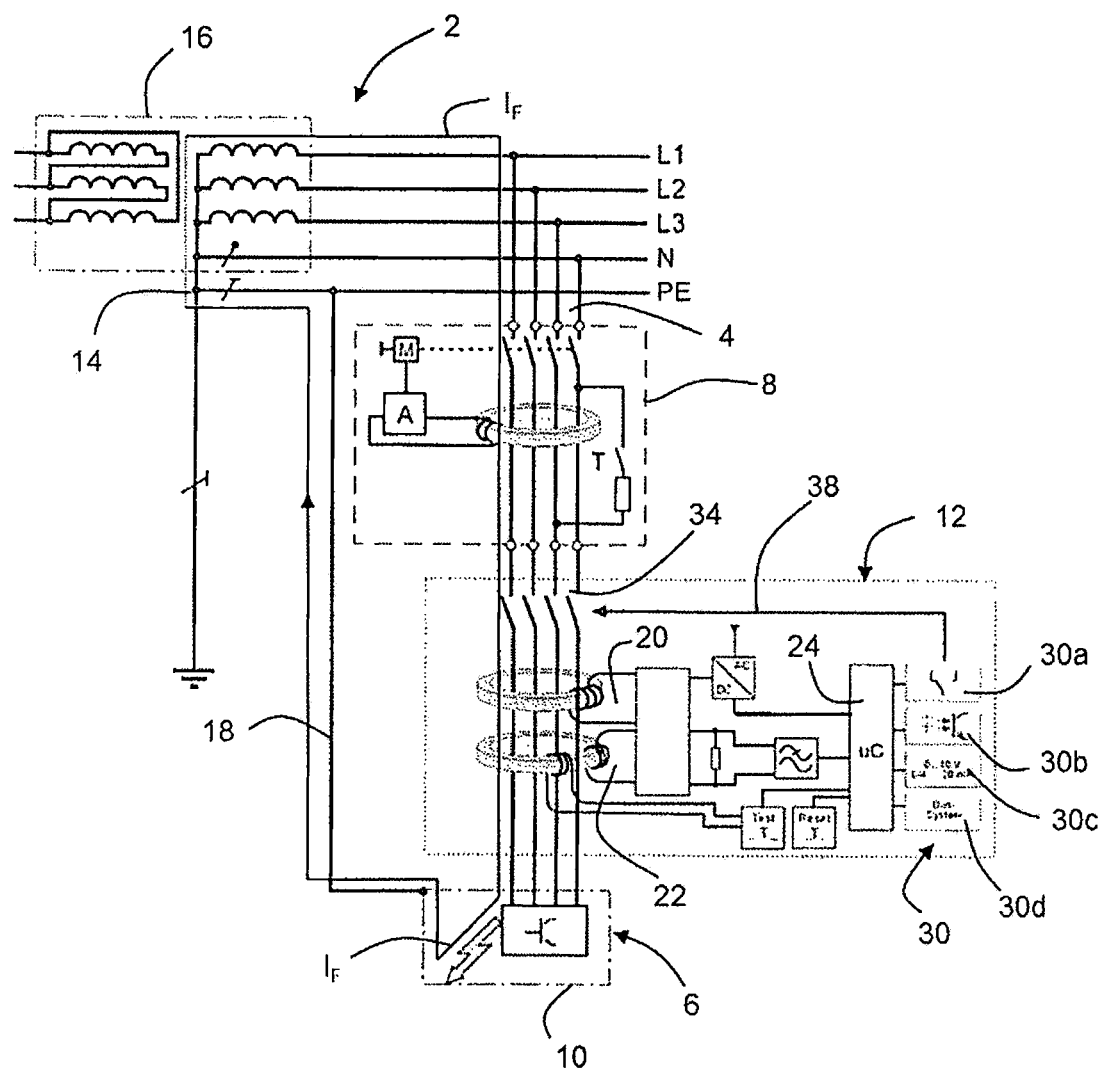

ELECTRICAL MONITORING DEVICE AND METHOD FOR SAFEGUARDING THE PROTECTIVE FUNCTION OF A TYPE A RESIDUAL CURRENT DEVICE (RCD)

CROSS REFERENCE TO RELATED APPLICATION

The present application claims the benefit of German Patent Application No. 10 2011 082 941.5 filed Sep. 19, 2011, which is fully incorporated herein by reference.

STATEMENT REGARDING FEDERALLY SPONSORED RESEARCH OR DEVELOPMENT

Not applicable.

FIELD OF THE INVENTION

The invention relates to a monitoring device and a method for safeguarding the function of a type A residual current device (RCD) in a power supply system.

The invention further relates to an electrical protection device with a type A residual current device (RCD) and with a monitoring device according to the invention for ensuring the function of the type A residual current device (RCD).

BACKGROUND OF THE INVENTION

Residual current devices (RCD) are known to serve as protective means in electrical systems in the event of contact between the bodies of electrical operating materials, and they are provided to offer protection in special areas of electrical systems.

The mode of operation of such a residual current device (RCD) relies on the fact that when an electrical system is working perfectly, the vectorial sum of the currents on all current-carrying conductors of a supply line is equal to zero, and thus there is no magnetic field around the supply line. If a residual current does occur and is drained outside of the supply line via an object or the ground due to an insulation fault, a differential current results. The variable magnetic field of this differential current induces a current on the secondary side, which triggers a switching element to isolate the faulty supply line.

In its simplest, most basic variant, based on the principle of induction a residual current device (RCD) is only able to detect temporal fluctuations in the magnetic flux, and accordingly in practice only pure AC residual currents or AC differential currents. However, consumers that are connected to the electrical system, for example electric machines comprising electronic semiconductor components such as diodes or thyristors in rectifiers or frequency inverters, are also capable of generating residual currents with a curve that is not purely sinusoidal, but instead have a pulsing plot over time. Consequently, residual current devices (RCD) have been designed that are able to detect these pulsed DC fault currents as well as purely AC fault currents. Such pulse-current sensitive residual current devices (RCD) are also called type A residual current devices (RCD).

The properties for (fixed) residual current devices of type A are defined in the standards IEC 61008 and 61009, and in standard IEC 62335 for portable residual current devices (PRCD) for various rated differential currents (rated release currents). However, the protective effect of type A residual current devices (RCD) is only operative if they are selected correctly with regard to rated differential currents and the influence of DC fault currents.

In practical operation, it has proven disadvantageous that the release behaviour of such devices, that is to say the dependency of response value and response time, can be affected negatively by currents and frequencies that are above the specified ratings. In this context, the core of the measuring current transformer may be pre-magnetised depending on the magnitude of the DC fault current and/or the magnitude and frequency of the AC fault current, and this pre-magnetisation raises the release threshold, or even prevents the RCD from being released altogether.

Such a situation may occur for example while an electric vehicle is being charged at a charging station if the charging station provides AC voltage and is equipped with a type A residual current device (RCD). If an insulation fault in the charging installation causes the DC fault current—determined essentially by the insulation resistance of the combined unit of charging station and electric vehicle—to exceed a maximum permissible DC fault current limit of 5 mA or 6 mA, as defined in the technical standards, the function of the type A residual current device (RCD) in the charging station may be restricted.

Accordingly, DC fault currents above a value of 6 mA, the maximum permitted for type A residual current devices (RCD), are considered critical. With regard to AC fault currents, values higher than 30 mA for example and a frequency of 50/60 Hz or above 1000 Hz are considered critical for type A RCDs. These standardised limits for maximum permissible fault currents in type A residual current devices (RCD) may vary from country to country. For example, the maximum permissible DC fault current in the USA is 5 mA, whereas the currently applicable standard IEC value is 6 mA.

SUMMARY OF THE INVENTION

In view of the preceding, the object of the present invention is to ensure the function of a type A residual current device that complies with the standard and thus guarantee improved electrical protection.

This object is solved with a monitoring device comprising a measuring current transformer circuit for detecting a DC fault current, an evaluation unit for processing the current detected by the measuring current transformer circuit, and a communication interface connected to the output from the evaluation unit.

In order to ensure the function of the type A residual current device (RCD), a monitoring device is suggested that according to the invention comprises a measuring current transformer circuit whose purpose is to detect DC fault currents. The differential current detected is converted into a signal that can be evaluated, which is forwarded to an evaluation unit. The monitoring device also comprises a communication interface that is connected to the output of the evaluation unit and converts the result of the evaluation into an output signal. With this design according to the invention, it is possible to detect a DC fault current that is likely to impair the function of a type A residual current device (RCD). Depending on the result of the evaluation, corresponding output signals may be transmitted across the communication interface to initiate further protective measures such as shutting down the faulty outgoing power feed or outputting warning messages. It is thus assured that the type A residual current device (RCD) is capable to fulfil its primary function unimpaired.

In order to prevent malfunctions of the type A residual current device (RCD) due to (excessively) high DC fault currents, it is advantageous to configure the measuring current transformer circuit in conjunction with the evaluation unit such that it is able to detect a DC fault current having a current strength greater than a settable DC fault current value. With this design, the monitoring device may be adapted to a maximum permissible DC fault current of the type A residual current device (RCD).

The measuring current transformer circuit in conjunction with the evaluation unit is preferably set such that the DC fault current limit value is equivalent to a maximum permissible DC fault current defined by a standard for a type A residual current device (RCD). DC fault currents that occur above maximum permissible current strength of 5 mA or 6 mA as prescribed by the technical standards are thus detected by the measuring current transformer circuit in conjunction with the evaluation unit and cause the conduction current circuit in question to be shut off.

It is further advantageous if the monitoring device comprises a further measuring current transformer circuit for detecting an AC fault current. With the further measuring current transformer circuit, it is also possible to detect function-impairing AC fault currents in similar manner to the detection of DC fault currents in order to guarantee the protective function of a type A residual current device (RCD).

A further advantageous design is achieved by designing the further measuring current transformer circuit in conjunction with the evaluation unit so that it detects an AC fault current having a current strength greater than a settable AC fault current limit value and having a frequency higher than a settable frequency value. In this way, the further measuring current transformer circuit may be adapted to a standard-compliant type A residual current device (RCD) that is to be monitored with regard to the current strength and frequency of the AC differential current. If AC fault currents with a current strength and frequency above these limit values arise, this further measuring current transformer circuit is activated and in conjunction with the evaluation unit and the communication interface it generates an output signal that causes the conduction current circuit to be switched off.

On the basis of rating values for type A residual current devices (RCD) set forth in the standards, it is expedient for the further measuring current transformer circuit in conjunction with the evaluation unit to be set such that the settable AC fault current limit value is equivalent to a standardised limit of a maximum permissible AC fault current for the type A residual current device (RCD) (8) and that the frequency limit value is 50 Hz or 60 Hz or 1000 Hz.

The monitoring device according to the invention comprises a communication interface for activating external electrical devices and for exchanging data with other instruments. It is preferably equipped with a relay output for activating a shutoff device. In this way, a fault current likely to threaten functioning that is detected by the monitoring device according to the invention is converted into an output signal that controls a shutoff device and causes the faulty outgoing power feed to be shut off.

The communication interface expediently also has a PWM output and/or a standardised current signal output and/or a bus interface.

Flexibility in terms of setting and communication capabilities as well as an automated sequence of measuring processes enables the evaluation unit to serve as a microcontroller.

The monitoring device is preferably constructed in the form of a printed circuit board for installation in any device units, or it has the form of a printed circuit board with housing as a stand-alone structural unit.

The monitoring device is advantageously designed to detect fault currents in a power supply grid designed as a TN system. DC currents that threaten function can occur particularly in charging points for electric vehicles, so the capability to adapt to the fixed, grounded (TN) system is advantageous.

In a further variation, the monitoring device comprises the shutoff device for shutting off a faulty outgoing power feed. In this embodiment, the shutoff device is assigned to the monitoring device and may be integrated therewith as a single unit.

The object underlying the invention is also solved by an electrical protection device comprising a type A residual current device (RCD) and a monitoring device according to the invention for safeguarding the function of the type A residual current device (RCD). By combining a standard-compliant type A residual current device (RCD) with the monitoring unit according to the invention, a safer technical protective arrangement is created. A disadvantageous effect on the tripping characteristics of that type A residual current device (RCD) based on fault currents with current strengths and/or frequencies above the values that define the type A residual current device (RCD) is prevented by the detection of these function-impairing differential currents.

In a preferred variant, the monitoring device according to the invention is connected in series with the type A residual current device (RCD) to safeguard the function of the type A residual current device (RCD). In principle, the order in which the two devices are connected is not important, since their sum current transformers include the same feed line and the same (fault) current therefore flows through both of them.

With regard to a method for safeguarding the function of a type A residual current device (RCD), the object is solved by the fact that a DC fault current is detected outside the type A residual current device (RCD) with a measuring current transformer circuit, the currents detected by the measuring current transformer circuits are processed by an evaluation unit, and an output signal is generated by a communication unit connected to the output of the evaluation unit.

The basic idea on which the method according to the invention is founded is to detect the current in a type A residual current device (RCD) and then also evaluate it with a measuring current transformer circuit that is independent of the RCD in order to "intercept" those fault currents that might negatively impact the function of the type A residual current device (RCD). To do this, a DC fault current is detected by a measuring current transformer circuit and evaluated by an evaluation unit.

In a preferred variant, the evaluation unit generates a shutoff signal if the DC fault current detected by the measuring current transformer circuit has a current strength greater than changeable DC fault current limit value. The measuring current transformer circuit may thus be tuned to the standard-compliant residual current devices (RCD) in order to determine precisely those fault currents that would result in a disruption to the tripping characteristics of the type A residual current device (RCD). As soon as a DC fault current exceeds the preset current limit value, the evaluation unit ascertains this and generates a shutoff signal.

With regard to the residual current devices (RCD) specified according to prescriptive standards, the changeable DC fault current limit value is set to a limit for maximum permissible DC fault current that is defined by standards for the type A residual current device (RCD), and may be for example 5 mA or 6 mA.

It has proven advantageous if an AC fault current is detected outside the type A residual current device (RCD) with an additional measuring current transformer circuit, the current detected by an additional measuring current transformer circuit is processed by an evaluation unit, and an output signal is generated by a communication interface connected to the output from the evaluation unit. In similar manner to the detection of function-impairing DC fault currents, critical AC fault currents may also be detected with the additional measuring current transformer circuit and processed further to safeguard the protective function of the type A residual current device (RCD).

In a preferred variation, the evaluation unit generates a shutoff signal if the AC fault current detected by the additional measuring current transformer circuit has a current strength greater than a changeable AC fault current limit value and a frequency higher than a changeable frequency limit value. The monitoring function of the additional measuring current transformer circuit may thus be adapted to the type A residual current device (RCD) that is to be monitored with respect to critical AC fault currents and if necessary trigger a shutoff or issue a warning message.

The changeable AC fault current limit value is preferably set to a limit of a maximum AC fault current permissible for the type A residual current device (RCD) with reference to the prescriptive standards for type A residual current devices (RCD) and may be for example 30 mA. The changeable frequency limit value is preferably set to 50 Hz or 60 Hz or 1000 Hz.

The shutoff signal generated by the evaluation unit is converted into an output signal in the communication interface and causes the shutoff of the faulty outgoing power feed via the shutoff device. In this way, the function of the type A residual current device (RCD) is guaranteed with even greater electrical safety by the shutoff of the malfunctioning power circuit.

Other advantageous variation features will be evident from the following description and the drawing, which explains a preferred embodiment of the invention with reference to an example thereof.

BRIEF DESCRIPTION OF THE DRAWINGS

In the drawing:
FIG. 1: shows a TN electricity supply system with a type A residual current device (RCD) and monitoring device in accordance with the invention.

DETAILED DESCRIPTION OF THE EXAMPLE EMBODIMENTS

FIG. 1 shows an electricity supply system 2 designed as a TN system 2, to which an operating component (consumer) 6 is connected via a feed line (outgoing power feed) 4. A type A residual current device (RCD) 8 is arranged in outgoing power feed 4 to provide protection in the event that bodies 10 of electrical operating components 6 come into contact. In order to safeguard the function of type A residual current device (RCD) 8, a monitoring device 12 according to the invention in the variant with two measuring current transformer circuits (20, 22) is connected in series. TN system 2 includes three outer conductors L1, L2 and L3 besides the neutral conductor N and the protective ground PE. A point 14 at power feed 16 is grounded directly, body 10 of operating component 6 is connected to this grounding point 14 via a protective ground connection 18.

The inventive monitoring device 12 has two measuring current transformer circuits 20, 22, of which first measuring current transformer circuit 20 serves to detect AC fault currents, and second measuring current transformer circuit 22 serves to detect DC fault currents. Second measuring current transformer 22 has an additional winding to compensate for DC magnetisation effects, and this is makes it possible to detect DC current.

The evaluable measurement signals 20, 22 generated by measuring current transformer circuits 20, 22 are forwarded to an evaluation unit 24, which has the form of a microprocessor 24 in the example shown. The result of the evaluation is output via communication interface 30. In the example shown, communication interface 30 has the form of a relay output 30a for controlling a shutoff device 34, a PWM output 30b, a standardised current signal output 30c and a bus interface 30d. Shutoff device 34 is only assigned functionally to monitoring device 12, so it may be arranged apart from the housing of monitoring device 12.

The drawing also shows a fault current $I_F$ that is caused by equipment contact between active feed L1 and element 10 of operating component 6 and passes through protective ground connection 18 of operating component 6 and grounding point 14. If this fault current $I_F$ exceeds a certain level, and—in the case of AC fault current—a certain frequency as well, this can lead to impairment of the functioning of type A residual current device (RCD) 8. Due to the monitoring device 12 that is connected in series with type A residual current device (RCD) 8, the differential current $I_F$ is also detected by measuring current transformer circuits 20, 22 and evaluated by evaluation unit 24. If a function-limiting fault current $I_F$ is ascertained, evaluation unit 24 generates a shutoff signal, which is converted into an output signal 38 by relay output 30a of communication interface 30 and causes the faulty outgoing power feed to be shut off by shutoff device 34.

The invention claimed is:

1. An electrical protection device comprising:
   a type A residual current device (RCD) in an electricity supply system;
   a monitoring device safeguarding the function of the type A residual current device (RCD), the monitoring device being connected in series to the type A residual current device (RCD), said monitoring device comprising:
   a measuring current transformer circuit detecting a DC fault current ($I_F$) that impairs the function of the type A residual current device (RCD);
   an evaluation unit processing the current detected by the measuring current transformer circuit;
   a communication interface connected to an output of the evaluation unit; and
   a separate shutoff device shutting off a faulty outgoing power feed.

2. The electrical protection device as recited in claim 1, in which the measuring current transformer circuit is designed in conjunction with the evaluation unit to detect the function impairing DC fault current ($I_F$) having a current strength greater than a settable DC fault current limit value.

3. The electrical protection device as recited in claim 2, in which the measuring current transformer circuit is designed in conjunction with the evaluation unit in such a manner that the DC fault current limit value is equivalent to a limit defined by prescriptive standards of a maximum permissible DC fault current for the Type A residual device (RCD).

4. The electrical protection device as recited in claim 1, in which the communication interface has a relay output for controlling the shutoff device.

5. The electrical protection device as recited in claim 1, in which the communication interface has at least one of a PWM output, a standardised current signal output, and a bus interface.

6. The electrical protection device as recited in claim 1, in which the evaluation unit is a microcontroller.

7. The electrical protection device as recited in claim 1 formed on a printed circuit board for installation in a device or with housing as a stand-alone structural unit.

8. The electrical protection device as recited in claim 1, in which the monitoring, device is adapted for detecting fault currents ($I_F$) in an electricity supply grid designed as a TN system.

9. An electrical protection device comprising:
- a type A residual current device (RCD) in an electricity supply system;
- a monitoring device safeguarding the function of the type A residual current device (RCD), the monitoring device being connected in series to the type A residual current device (RCD), said monitoring device comprising:
- a measuring current transformer circuit for detecting a DC fault current ($I_F$);
- an evaluation unit for processing the current detected by the measuring current transformer circuit;
- a communication interface connected to an output of the evaluation unit;
- a separate shutoff device shutting off a faulty outgoing power feed; and
- a further measuring current transformer circuit for detecting an AC fault current ($I_F$).

10. The electrical protection device as recited in claim 9, in which the further measuring current transformer circuit is designed in conjunction with the evaluation unit for detecting an AC fault current ($I_F$) that has a current strength greater than a settable AC fault current limit value and a frequency higher than a frequency limit value.

11. The electrical protection device as recited in claim 10, in which the further measuring current transformer circuit in conjunction with the evaluation unit is adjusted in such manner that AC fault current limit value is equivalent to a limit set by prescriptive standard of a maximum permissible AC fault current for the type A residual current device (RCD), and the frequency limit value is one of 50 Hz, 60 Hz, and 1000 Hz.

12. A method for safe guarding the function of a type a residual current device (RCD) in a power supply system, said method comprising detecting a function-impairing DC fault current (IF) outside a type A residual current device (RCD) with a measuring current transformer circuit of a monitoring device, which is connected in series to the Type A residual current device (RCD); processing the current detected by the measuring current transformer circuit with an evaluation unit; generating an output signal using a communication interface connected to the output of the evaluation unit causing the shutoff of the faulty outgoing power feed via a separate shutoff device.

13. The method as recited in claim 12, including generating a shutoff signal by the evaluation unit if the function impairing Dc fault current ($I_F$) detected by the measuring current transformer circuit is greater than a changeable DC fault current limit value.

14. The method as recited in claim 13, including setting the changeable DC fault current limit value to a limit of a maximum permissible DC fault current defined by a prescriptive standard for a type A residual current device (RCD).

15. The method as recited in claim 12, including detecting an AC fault current ($I_F$) outside the type A residual current device (RCD) with an additional measuring current transformer circuit, processing the current detected by the additional measuring current transformer circuit with an evaluation unit, and generating an output signal by a communication interface connected to the output of the evaluation unit.

16. The method as recited in claim 15, including generating a shutoff signal using the evaluation unit if the AC fault current ($I_F$) detected by the additional measuring current transformer circuit has a greater current strength than a changeable AC fault current limit value and a frequency higher than a changeable frequency limit value.

17. The method as recited in claim 16, including setting the changeable AC fault current limit value to a limit of a maximum permissible AC fault current defined by a prescriptive standard for the type A residual current device (RCD) and the changeable frequency limit value is set to one of 50 Hz, 60 Hz and 1000 Hz.

* * * * *